March 27, 1934.    G. E. GRIMM    1,952,669
WEATHER STRIP
Filed Oct. 16, 1931
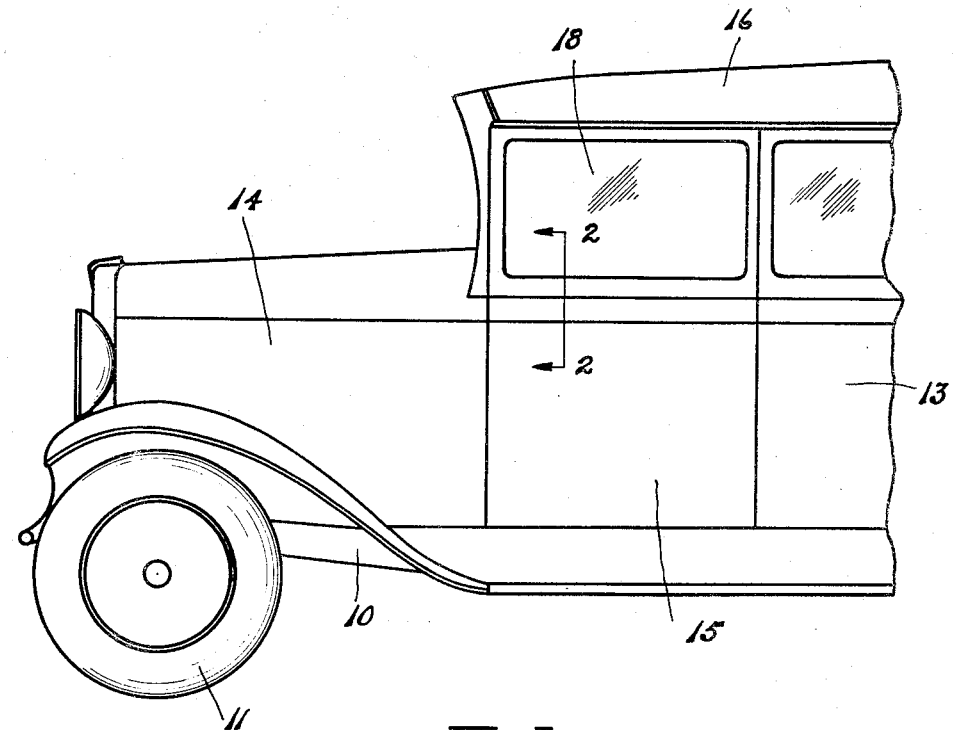
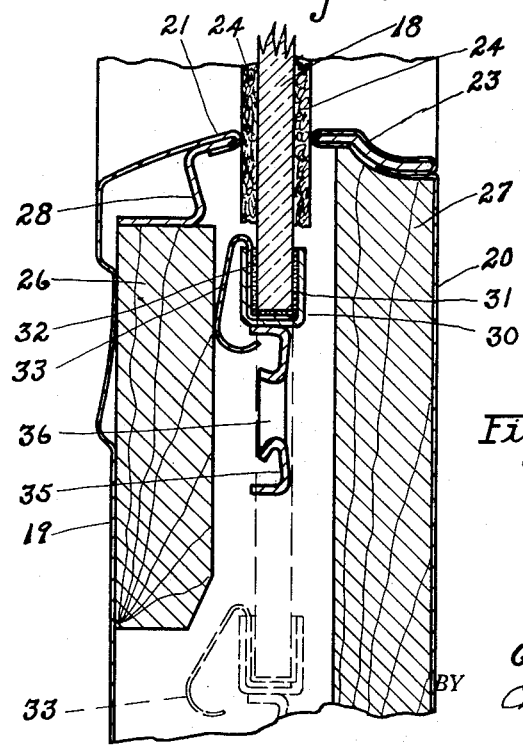
INVENTOR.
GEORGE E. GRIMM
BY Chester H Braselton
ATTORNEY.

Patented Mar. 27, 1934

1,952,669

UNITED STATES PATENT OFFICE 1,952,669

WEATHER STRIP

George E. Grimm, Toledo, Ohio, assignor to The Willys-Overland Company, Toledo, Ohio, a corporation of Ohio Application October 16, 1931, Serial No. 569,188

2 Claims. (Cl. 20—69)

This invention relates to movable glazed window constructions and more particularly to a mounting for movable vehicle body windows.

The invention contemplates the provision of a novel and effective means associated with a movable vehicle window for preventing the ingress of dust, rain, wind and the like into the vehicle.

The invention embraces a so-called weatherstrip for use with movable glazed windows which also acts as an effective anti-rattle or vibration dampening means.

A further object of the invention is the provision of a simple and effective weather-strip and anti-rattling construction which is capable of ready installation without substantial modification or change in the existing window arrangement.

Further objects and advantages are within the scope of the invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which Figure 1 is fragmentary side elevational view showing a portion of an automotive vehicle embodying my invention.

Figure 2 is a fragmentary vertical sectional view taken substantially on the line 2—2 of Figure 1 and illustrates in detail the device of my invention.

I have illustrated the device of my invention as incorporated in the movable glazed window construction of an automotive vehicle, but it is to be understood that my device is susceptible of various uses such, for example, as car windows, building constructions and the like wherever the same may be found to be applicable.

Referring to the drawing in detail, the figure with which I have shown my invention comprises substantially a chassis 10, wheels 11, the chassis supporting a body construction 13 consisting of a hood portion 14 and a door 15 and top portion 16. The door 15 is preferably fabricated of a metal framework and having a glazed window 18. The exterior and portions of the interior of the door are formed of sheet material as at 19 and 20, the portion 19 terminating adjacent the window 18 in a hook like portion 21, the latter being spaced away from the window 18 to allow clearance for vertical movement of the latter. A plate 23 is secured to the upper part of the sheet metal panel 20 and is also spaced away from the inside surface of the glass 18 to provide suitable operation clearance. The glass is adapted to operate in suitable guides 24 of felt or other suitable material.

Positioned transversely of the door are a pair of panel members 26 and 27 preferably made of wood or other suitable material, panel 26 being secured by means of a bracket 28 to the portion 21 of panel 19. The panel 27 is suitably secured to the metal panel 23 by means (not shown).

The window 18 is supported at its lower edge by means of a U-shaped channel member 30, a lining of felt 31 or other suitable material being interposed between the metal channel 30 and the window 18 to provide a flexible or partially resilient support for the glass. Positioned between the felt 31 and the channel 30 along the lower edge and one side of the glass is a member 32 which is securely held in position by means of the channel 30, the member 32 having a downwardly projecting portion 33. The member 32 and the downwardly depending portion 33 thereof are preferably formed of material having resilient characteristics as, for example, steel, the portion 33 being formed to normally occupy the position illustrated in dotted lines in Figure 2. Obviously when the window is moved from the position shown in dotted lines to the full line position in Figure 2, the portion 33 of the member 32 engages the inner wall of the panel 26, thus providing a closure to prevent the ingress of rain, wind and the like into the body, as a seal is provided between the portion 33 and the panel 26.

Due to the inherent resilience in the portion 33 of member 32 a comparatively slight lateral pressure is exerted upon the channel member 30 and window 18 which holds the latter in engagement with one of the felt guides 24 and thus decreases or dampens any vibrations of the parts and prevents rattle. Secured to the channel member 30 is a bracket 35 which has an opening 36 suitably adapted to receive and accommodate a window lifting or operating mechanism (not shown).

It is apparent that, within the scope of the invention modifications and different arrangements may be made other than is herein disclosed, and the present disclosure is illustrative merely, the invention comprehending all variations thereof.

What I claim is:

1. In a vehicle window, the combination of a movable glazed plate; a channel member secured to said plate; a frame member having a uniplanar portion of substantial width adjacent to and arranged substantially parallel with the plane of movement of said glazed plate; a metallic member secured to said channel member, said metallic member having a portion adapted to contact with the uniplanar portion of said frame member throughout a substantial distance of movement of the glazed plate.

2. In a vehicle window, the combination of a movable glazed plate; a channel member secured to said plate; a frame member having a uniplanar face of substantial width adjacent to and arranged substantially parallel with the plane of movement of said plate; a metallic member secured to said channel member, said metallic member having a portion extending laterally and downwardly from said glazed plate, the extremity of said member being bent toward said glazed plate, the intermediate portion of said member engaging with the uniplanar face of said frame member throughout a substantial distance of movement of said glazed plate.

GEORGE E. GRIMM.